United States Patent
Bowles et al.

[11] 3,798,959
[45] Mar. 26, 1974

[54] ACOUSTIC GAUGE AND FLUIDIC SIGNAL PROCESSING CIRCUITRY THEREFOR

[75] Inventors: Romald E. Bowles, Silver Spring; Peter Bauer, Germantown, both of Md.

[73] Assignee: Bowles Fluidics Corporation, Silver Spring, Md.

[22] Filed: Aug. 11, 1972

[21] Appl. No.: 280,054

[52] U.S. Cl. .................. 73/37.5, 73/67.2, 137/804
[51] Int. Cl. .......................................... G01b 13/00
[58] Field of Search ............. 73/37.5, 67.2; 137/804

[56] References Cited
UNITED STATES PATENTS

| | | | |
|---|---|---|---|
| 3,243,992 | 4/1966 | Woods | 73/37.5 |
| 3,556,120 | 1/1971 | Bauer | 137/804 |
| 3,694,800 | 9/1972 | Frank | 73/37.5 X |

*Primary Examiner*—Richard C. Queisser
*Assistant Examiner*—Joseph W. Roskos
*Attorney, Agent, or Firm*—Rose & Edell

[57] ABSTRACT

Fluidic techniques are utilized to provide a highly sensitive gauge. An open-ended tube is excited by a fluid stream flowing past one end to produce standing waves in the tube. Proximity of a sensed object to the opposite tube end is measured in terms of the frequency of the standing waves. For small displacements of the object from the tube there exists a range of increasing displacement over which the standing wave frequency exhibits a large continuous increase. The standing wave frequency is measured with an acoustic pick up or by monitoring the resulting deflections of the excitation stream. In one embodiment the gauge is employed to measure bore holes wherein temperature reference and orientation reference frequencies are provided by similar oscillators. Processing of the measured frequency is effected by counting the temperature reference and measurement frequencies simultaneously in respective counters and stopping the measurement frequency count after the temperature reference frequency reaches an adjustable predetermined count. The resulting count ratio is a measure of the sensed object displacement, fully compensated for temperature. Alternately, the beat frequency between the measurement and temperature reference frequencies provides partial temperature compensation. In the latter case, a go-no go measurement is achieved by comparing the beat frequency to a fixed clock frequency and actuating an indicator when two beat frequency cycles occur during one clock cycle.

18 Claims, 11 Drawing Figures

PATENTED MAR 26 1974　　3,798,959

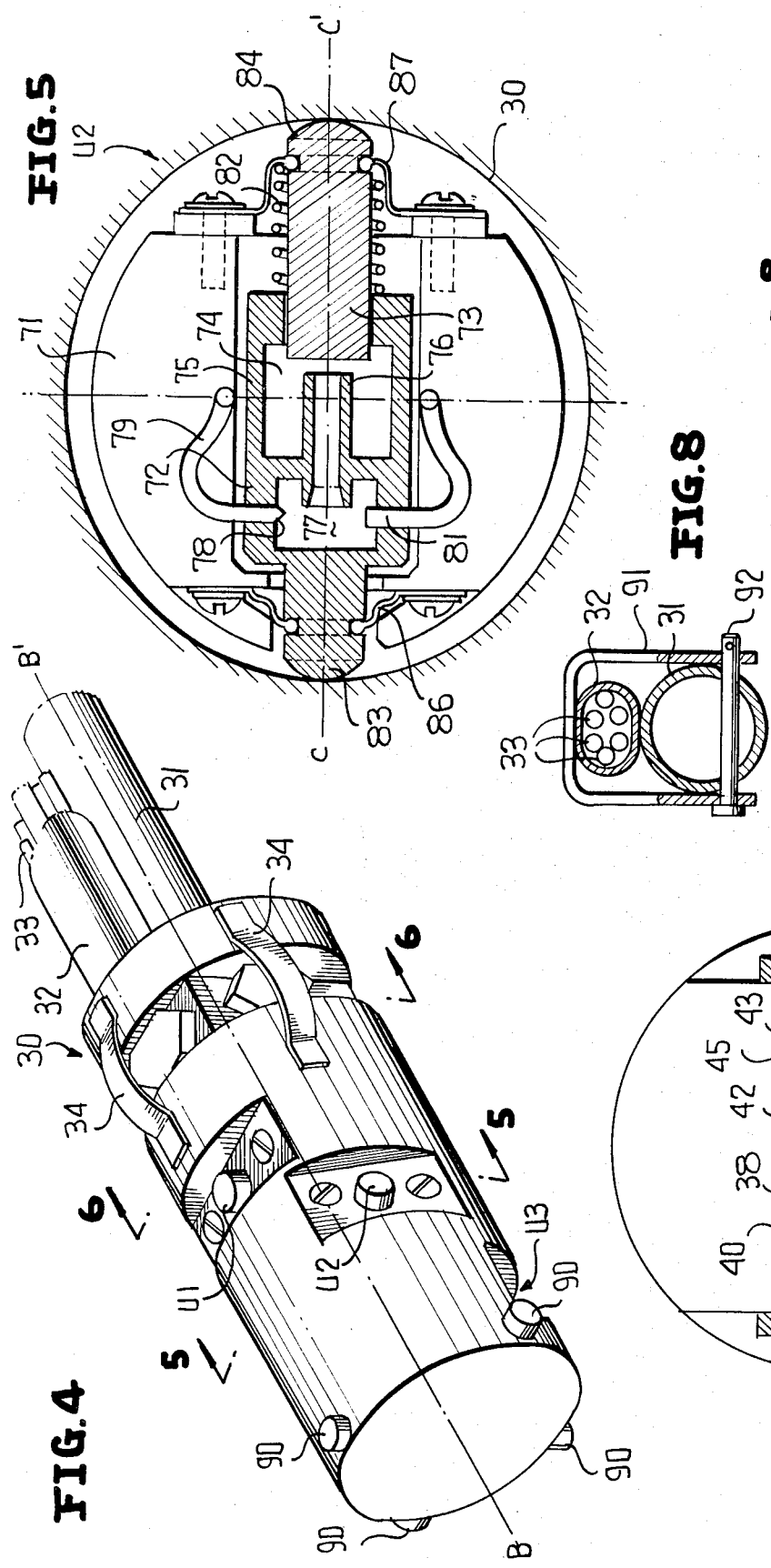

ACOUSTIC GAUGE AND FLUIDIC SIGNAL PROCESSING CIRCUITRY THEREFOR

BACKGROUND OF THE INVENTION

The present invention relates to improvements in acoustic gauging and fluidic circuits employed in the processing of fluid signals.

Automatic gauging of a distance between a reference plane and a surface has been achieved in a variety of ways in the prior art. Each approach has its own advantages and disadvantages. For example, one approach is to issue fluid under pressure toward an object being sensed. The back pressure upstream of the nozzle provides a measure of the distance between the nozzle and the object. This approach provides a linear pressure versus displacement characteristic for displacements up to approximately 0.005 inch. For greater displacements it is necessary to increase the pressure to such a relatively level. Instead of increasing the pressure, the pressure may be measured indirectly by contacting the sensed surface with a stylus operating a suitable valve which in turn modifies the air flow. This approach has the disadvantage of requiring moving parts which are subject to wear and tear and to calibration deterioration.

In U.S. Pat. No. 3,243,992 to Woods there is disclosed a gauging device in which a column of air is caused to vibrate at a constant acoustic frequency under the excitation of a loud speaker diaphragm at one end of a tube. The amplitude of the vibrations at the other end of the tube is employed as a measurement parameter representing the proximity of an object to that end of the tube. This device provides a linear amplitude versus displacement characteristic over a large range of displacements above 0.10 inch; however, for smaller displacements the measurements are extremely non-linear. In addition the sensitivity of the device (in terms of amplitude units per inch) is small and is not readily adjustable. Moreover, the Woods approach requires pressure to voltage transducers, leaving room for error during parameter conversion.

One final prior art approach to be discussed is disclosed in U.S. Pat. No. 3,556,120 to Bauer. In that patent a fluidic organ pipe oscillator is rendered condition-responsive to provide a variable frequency as a function of the sensed condition. The oscillator includes a tube in which standing waves are generated by passing a fluid stream past the tube mouth. A piston is slidable in the tube as a function of a sensed condition (e.g., — object proximity), rendering the tube a closed-ended organ pipe having a variable length. The standing wave frequency is monitored as a measure of the sensed condition either by means of an acoustic pickup or by means for detecting the deflection of the excitation stream produced by the standing waves. This approach is highly reliable and advantageous for many purposes; however, its sensitivity (i,e., — in Hertz per inch of piston displacement) is limited by the physical relationship between the effective length of the tube and the frequency of the standing waves produced therein for a closed-ended organ pipe. For a tube of nominally 1 inch length, operating in a third harmonic mode with a nominal standing wave frequency of 10KHz, the sensitivity for displacements up to 0.050 inch is approximately 10.4 KHz per inch. As is described hereinbleow, the gauge of the present invention is capable of sensitivities at least an order of magnitude better.

It is therefore an object of the present invention to provide a highly reliable and sensitive acoustic gauge capable of accurately measuring small displacements.

It is another object of the present invention to provide an acoustic gauge in which the frequency of a standing wave is varied over a relatively large range of frequencies in response to relatively small variations of displacement in the range between zero and 0.050 inches.

Another aspect of the present invention relates to processing a variable frequency acoustic signal to provide a meaningful measurement or indication. In many gauging environments the temperature of the air or the constituent make up of the air may vary considerably from measurement to measurement. Such variations affect the frequency of the standing waves in an acoustic gauge and can thereby cause erroneous measurements.

It is another object of the present invention to provide a measurement technique for variable frequency signals which completely compensates for ambient conditions which affect frequency.

It is still another object of the present invention to provide signal processing for an acoustic gauge which inherently compensates for temperature and other ambient condition variations.

Processing of the acoustic gauge signal may, for some applications, also require a go-no go device which actuates an indicator or operates a control when the gauged parameter exceeds or falls below a predetermined value. Where, as in an acoustic gauge, frequency serves as a measurement parameter, accurate threshold switching is not often attainable. For example, most prior art frequency threshold devices utilize integrators which effectively convert frequency to amplitude. Upon attaining a specified level, the integrator output signal operates the required threshold device. This approach loses accuracy in conversion, particularly where the frequency is that of a fluid signal and the integrator is a frequency to pressure converter.

It is therefore another object of the present invention to provide a fluidic circuit capable of accurately triggering a threshold device when a fluid signal frequency reaches a predetermined level.

It is another object of the present invention to provide a go-no go fluidic circuit for use with an acoustic gauge.

SUMMARY OF THE INVENTION

In accordance with one aspect of the present invention an acoustic gauge comprises a tube employed as an open-ended organ pipe oscillator. We have found that for displacements of an object from the sensor end of the tube, which displacements are very small relative to the inside diameter of the tube, the frequency versus displacement characteristic of the oscillator is positive, in spite of the fact that one would normally expect the standing wave frequency to decrease as the effective length of the vibrating air column. In this small range of displacements the sensitivity of the oscillator (in Hz per inch of displacement) is an order of magnitude greater than the sensitivity in a closed-ended condition responsive oscillator of the type disclosed in U.S. Pat. No. 3,556,120 to Bauer.

In accordance with another aspect of the present invention, a reference organ pipe oscillator of constant wave-length is placed in the same environment as the acoustic gauge. The reference oscillator frequency changes with temperaure, air composition, and other ambient conditions which affect the gauge frequency. The reference frequency is applied to a counter; the gauge frequency is applied to another counter. After a predetermined number of reference frequency counts, which number is adjustable, the ratio of the two counts provides a measurement of the gauged parameter, completely compensated for temperature, air composition, and other ambient conditions affecting frequency. Further, as the reference count number is increased, the accuracy of the measurement is increased.

A go-no go measurement is obtained by first obtaining the beat frequency between the gauge and reference frequencies. The beat frequency is then compared to a fixed frequency signal which establishes a threshold for the beat frequency. If the beat frequency exceeds a predetermined number of cycles within one fixed frequency period, a threshold indication is tripped to provide an accurate indication that the gauged parameter has exceeded a specified limit.

BRIEF DESCRIPTION OF THE DRAWINGS

The above and still further objects, features and advantages of the present invention will become apparent upon consideration of the following detailed description of specific embodiments thereof, especially when taken in conjunction with the accompaning drawings, wherein:

FIG. 4 is a view in perspective of an apparatus for measuring dimensions along three transverse axes of a borehole;

FIG. 5 is a view in section taken along lines 5—5 of FIG. 4;

FIG. 6 is a view in section taken along lines 6—6 of FIG. 4;

FIG. 7 is a view in section of a portion of the support rod for the apparatus of FIG. 4;

FIG. 8 is a view in section taken along lines 8—8 of FIG. 7;

DESCRIPTION OF PREFERRED EMBODIMENTS

Figure 1:
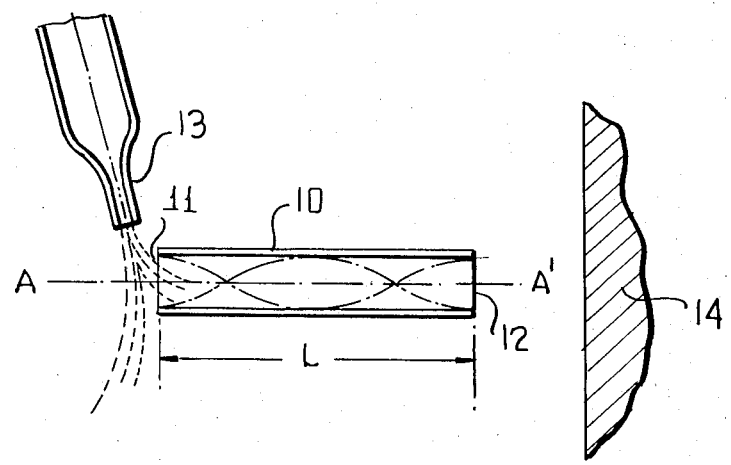
FIG. 1 is a diagrammatic representation of the acoustic gauging concept employed in the present invention.

Referring specifically to FIG. 1 of the accompanying drawings, there is illustrated an acoustic gauge comprising cylindrical tube 10 having a central longitudinal axis A-A'. The tube is open at both ends 11 and 12; end 11 serves as the mouth of the tube and end 12 serves as the sensor end. A nozzle 13 is positioned adjacent tube mouth 11 so as to issue a jet of air across the mouth. The issued air jet creates a standing wave pattern of vibrating air in tube 10. The frequency of the standing waves is dependent upon the length L of tube 10 and the velocity of sound V through the tube. Specifically the frequency f of the standing waves in an open tube is characteristically represented by equation (1):

$$f = nV/2L \qquad (1)$$

where $n$ represents the vibratory mode (i.e., — the dominant harmonic) and can be any positive integer. The mode is dependent, in part, on the position of nozzle 13 and the pressure of the issued jet. Generally, by adjusting these parameters one can easily render the fundamental ($n=1$), second ($n=2$) or third ($n=3$) harmonics dominant, The dominant frequency may be monitored by an acoustic pick up located near the mouth 11 of tube 10, or by monitoring the frequency of jet deflections produced by the vibrating air column. Both modes of monitoring the frequency are described in U.S. Pat. No. 3,556,120 to Bauer.

We have found that for a given oscillatory mode in tube 10, the placement of an object 14 proximate sensor end 12 affects the oscillation frequency in a heretofore unexpected manner. Specifically, over a small range of increasing displacement between object 14 and sensor end 12, the oscillation frequency increases as a continuous function of displacement. This behavior is manifested over a displacement range which is small compared to the inside diameter of tube 10 and is illustrated graphically in FIG. 2.

Figure 2:
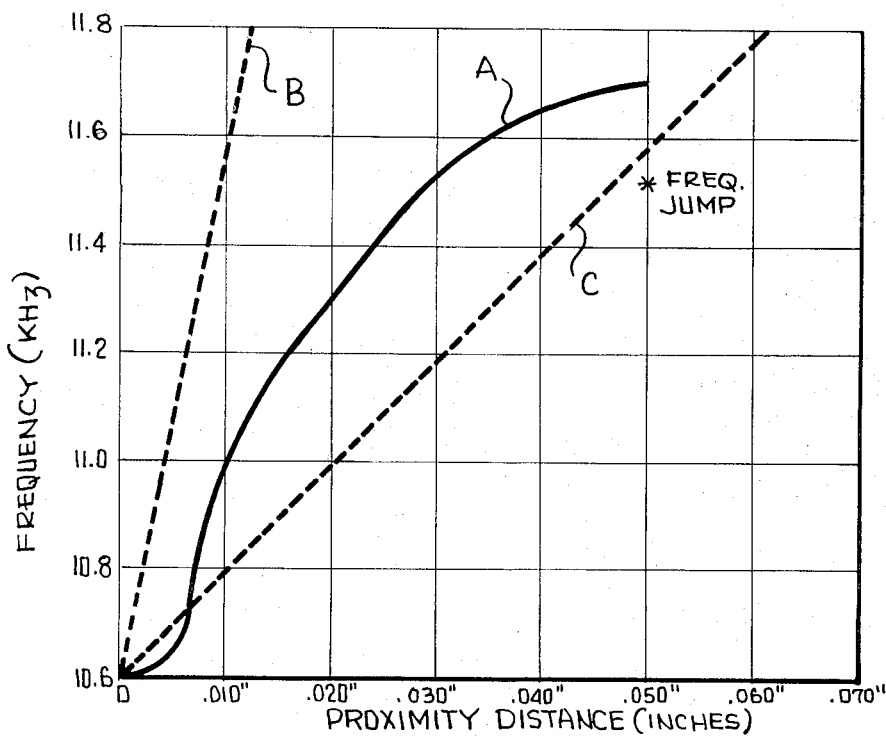
FIG. 2 is a plot of the output frequency versus gauged proximity distance in an acoustic gauge of the type illustrated in FIG. 1.

Referring to FIG. 2 of the accompanying drawings, there is illustrated a plot of oscillation frequency (in Kilohertz) versus displacement between sensor end 12 and object 14 (in inches). The curve A represents data plotted for a tube 10 wherein its length L is 1 inch and its inside diameter is five thirty-seconds inch. The nozzle 13 and the pressure of its issued jet were adjusted to render the second harmonic dominant (i.e., — $n = 2$) in the tube. The open ended tube 10, absent any object 14, was found to have a second mode oscillation frequency of 11.4 KHz. The presence of object 14 proximate sensor end 12 was found to strongly modify the frequency as illustrated by curve A. As illustrated, the curve is non-linear in the range between zero and 0.050 inch displacement. Two segments of the curve, however, are relatively linear; these segments reside between 0.005 inch and 0.010 inch, and between 0.010 inch and 0.030 inch. In the first of these segments the "gain" is 100 KHz per inch, as represented by dashed line B; in the second segment the gain is 20 KHz per inch, as represented by dashed line C. In both cases this is considerably greater than the 10.4 Khz per inch slope attained at a similar frequency with the closed tube arrangement described in the aforementioned Bauer patent.

As indicated by the asterisk in FIG. 2, the tested acoustic gauge exhibited a frequency jump (i.e., — to one-half the nominal mode frequency) when the distance of object 14 from sensor end 12 was increased beyond 0.050 inch. That is, a mode transition occurred at this displacement whereby the fundamental frequency (approximately 5.75 KHz) was rendered dominant.

The data plotted in FIG. 2 indicates that the tested sensor has a very high operating gain over a continuous range from about five thousandths to fifty thousandths of an inch displacement. In addition, larger displacement variations can be readily sensed as frequency mode changes.

The gauge requires no contact with the sensed surface; nor does it issue a pressurized jet against the sensed surface as do back-pressure type gauges. It is substantially a "zero-force" sensor in that it applies no net force to the sensed object; the pressure is oscillatory about ambient pressure at the object surface. The gauge is thus ideal for measuring displacements of sensitive objects, such as liquid surface levels which are readily perturbed by issued jets or contaminated by mechanical sensors.

Figure 3:
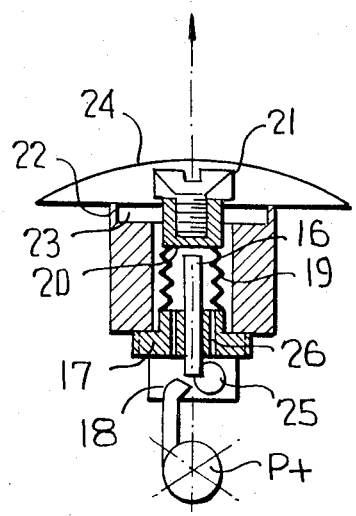
FIG. 3 is a view in section of an acoustic gauge according to the present invention.

Referring to FIG. 3, there is illustrated an embodiment of the acoustic gauge of the present invention which is utilized for applications in which it is desirable to contact a sensed object with a contacting member. Specifically, a hollow cylindrical sensor tube 16 is supported by and extends through a support member 17. The mouth of tube 16 projects from one side of member 17 where it is proximate a supply nozzle 18. The latter receives pressurized air (P+) and issues an air jet which creates a standing wave pattern in tube 16.

The sensor end of tube 16 extends internally of a spring-bellows 19 which is secured between support member 17 and an adjustment boot 21 in a fluid-tight manner. The adjustment boot includes a flat surface 20 which faces the sensor end of tube 16. The bellows extends interiorly of a retaining nut 22 and is slidable axially of tube 16 through an apertured collar 23 secured at one end of the retaining nut. Support member 17 is secured at the other end of the retaining nut. A contacting member 24 is secured to the adjustment boot 21 and includes an exterior surface which is adapted to contact a sensed object.

Spring-bellows 19 acts like an expansion spring to urge contacting member 24 outwardly and away from the sensor end of tube 16. When the gauge is in use, outward movement of the adjustment boot 21 and contacting member 24 is limited by the sensed object. The resulting gap between the sensor end of tube 16 and boot surface 20 is a measure of the location of the sensed object. The column of air in tube 16 oscillates at a frequency which is determined by the size of the gap between the tube and surface 20. This frequency is detected at an acoustic signal pick-up port 25 which provides an output signal for the gauge.

For many applications a simple expansion spring may be employed instead of a spring-bellows. The advantage of a spring-bellows, however, resides in the fact that it permits expansion of the gauge without exposing tube 16 to contaminants in the measurement environment. In this regard, it is important that surface 20 and the sensor end of tube 16 be clean and smooth in order to achieve precision measurements on the order of a few thousandths of an inch.

Sensors of the general type illustrated in FIG. 3 have particular utilization in the field of borehole measurements. Referring to FIGS. 4, 5 and 6, apparatus 30 is a sensor head arranged to be lowered by means of support rod 31 along axis B-B' into a borehole having transverse dimensions to be monitored. The metal or plastic head is of generally cylindrical configuration and is supplied with pressurized air via pneumatic tube 32. Tube 32 runs alongside support rod 31 and encompasses various signal lines 33 which carry the acoustic signals from the sensors in head 30 to ground surface above the borehole.

Three acoustic gauges U1, U2, U3 are spaced along head 30 and are positioned to extend radially outward from the sensor head along three respective axes which are mutually spaced by 60°. Three centering springs 34, extending between the upper portion and main body of sensor head 30, assure proper positioning of the head in the borehole. Four extendible anchor plungers 90 are located at the bottom of sensor head 30 and are pressure actuable to extend radially outward to secure the head at the desired borehole location.

The three gauges U1, U2, U3 are substantially identical except for their angular orientation about axis B-B'. Referring specifically to FIG. 5 of the accompanying drawings, gauge U2 is shown to comprise a generally circular gauge body member 71 which is secured to head assembly 30. The gauge itself extends through body member 71 and includes two primary components: namely, cylinder member 72 and piston member 73, both of which are translatable relative to each other and to body member 71 along axis C-C'. Axis C-C' is perpendicular to axis B-B' of sensor head 30 (see FIG. 4).

Cylinder member 72 includes a sleeve portion 75 at its radially inward end, the sleeve defining a hollow region 74 in which the inward end of piston member 73 is translatable. A sensor tube 76 is defined in cylinder member 72 and projects into hollow region 74 from an interaction chamber 77 which is also defined in the cylinder member. A supply nozzle 78 in chamber 77 receives pressurized fluid from pneumatic tube 32 (see FIG. 4) via flexible tube 79 and issues a jet of air across the mouth of sensor tube 76. The jet thus creates a standing wave pattern in the sensor tube 76, resulting in the cyclic deflection of the jet relative to receiver tube 81. The oscillatory signal at receiver tube 81 is conducted to an above-ground processing location via a signal line 33 (FIG. 4).

The sensor end of sensor tube 76 faces a smooth surface of piston member 73 in hollow region 74. The piston 73 includes a shaft portion surrounded by an expansion spring 82 which is secured to the cylinder member sleeve 75 at one end and to piston member 73 at its other end. The spring thus urges piston member 73 away from the sensing end of sensor tube 76.

The radially outward ends of cylindrical member 72 and piston member 73 are terminated in respective contact surfaces 83 and 84. The radially inward region between contact heads 83 and 84 is pressure sealed by means of flexible diaphragms 86 and 87, respectively, which are secured between gauge body 71 and respective contact heads 83 and 84. Since the connection between the gauge body 71 and each of the piston and cylinder members is flexible, both the piston and cylinder members can move relative to body 71 along axis C-C'. The sensors are thus mechanically decoupled from sensor head 30 and from one another.

The characteristic frequency of the standing wave pattern in sensor tube 73 is determined by the length of the tube and the gap length between the tube and piston member 73. This gap, in turn, is a measure of the borehole diameter along axis C-C' because the piston and cylinder members are urged apart by spring 82 until contact surfaces 83 and 84 abut the borehole wall. Since axis C-C' is oriented at a 60° angle relative to the axes of sensors U1 and U3, the three sensors are capable of measuring borehole diameter along three different axes.

A vacuum is applied to the supply line (i.e., — the region inside pneumatic tube 32) prior to insertion of sensor head 30 into a borehole. The vacuum results in a radially-inward retraction of each of the anchor plungers 90, cylinder members 72 and piston members 73. When sensor head 30 has been inserted to the desired borehole depth, the vacuum is replaced by pressurized gas, thereby: permitting plungers 90 to expand; setting up the standing wave pattern in sensor tube 76 of sensors U1, U2 and U3; and permitting the cylinder member 72 and piston member 73 of each sensor to extend radially into contact with the borehole wall. The acoustic signals present in receiver tubes 81 of each sensor are conducted to a processing location via respective signal lines 33. Processing can can be effected in the manner described below in relation to FIG. 9.

In many borehole measurements, particularly where the measurements are used to determine stress changes, it is the angular position of the sensor head 30 about axis B-B' which must be known. For boreholes which are substantially horizontal, angular orientation is monitored by reference oscillator 35 illustrated in FIG. 6. Oscillator 35 includes a generally annular tube 36 in which a ball or mercury bead 37 is located. The tube 36 communicates with one end of a short straight pipe 38, the other end of which is positioned proximate a nozzle 39. Nozzle 39, in turn, issues a jet of pressurized air which it receives from supply line 31. The air jet creates standing waves in pipe 38 and tube 36 at a frequency which is dependent upon the position of ball or bead 37 in the tube. Specifically, the effective wavelength of the vibrating air column is determined by the length of pipe 38 plus the length of tube 36 subsisting between pipe 38 and ball or bead 37 in the direction of the arrow in FIG. 6. The ball or bead, in turn, assumes a position determined by the rotational position of sensor head 30 about axis B-B' when the borehole is substantially horizontal. Sensor port 40 transmits the orientation reference signal, via a respective signal line 33, to above-ground processing circuits.

Also illustrated in FIG. 6 is a temperature reference oscillator 41. Since the gauge is dependent upon the speed of sound, and since the speed of sound varies with temperature and gas composition, it is necessary to provide an accurate temperature reference if accurate gauging is to be effected. Oscillator 41 includes a nozzle 42 which communicates with supply line 32 and issues an air jet past the mouth of open-ended resonant tube 43. The region is sealed from the effects of dirt and contamination by plug 44. The vibrating air column in tube 43 thus resonates in an open tube mode, and the resonant frequency is picked up at port 45 which communicates with a respective signal line 33.

Since the effective length of tube 43 is fixed, only variations in the speed of sound can affect the frequency of oscillator 41. The speed of sound is affected, in part, by temperature and constituent make-up of the vibrating air. Oscillator 41 thus provides a reference signal to permit compensation for all ambient conditions which affect the speed of sound and, therefore, the accuracy of the gauge measurements. Although it is understood that numerous ambient factors are compensated for by oscillator 41, its output signal, for ease in reference, will hereinafter be referred to as a temperature reference signal.

For substantially vertical boreholes, orientation information may be obtained from the support rod assembly 31 which is illustrated in detail in FIG. 7 and 8. Specifically, rod 34 actually comprises a plurality of rods 31 joined end-to-end. At each end-to-end junction the rods and pneumatic tube 32 are partially surrounded by a U-shaped sleeve 91, with tube 32 being disposed proximate the closed portion of the sleeve 91. Each rod is secured to the sleeve by means of a respective pin 93 which extends through the sleeve 91 and tube 31. The sleeve and pin arrangement thus rigidifies the support tube assembly 31 to assure that the orientation of sensor head 30 can be determined at the borehold entrance from the support rod orientation.

The sensors are arranged to measure the diametrical borehole changes by sensing relative motion of contact surfaces 24 (i.e., — the signal frequency decreases for decreasing diametrical change). The idea of borehole deformation measurements is to determine the change of in-situ stress. It is assumed that at greater than three borehole diameters displacement, the stress is as it was before boring. Also, as this in-situ stress changes, the borehole deforms accordingly; therefore measurement of these borehole changes actually determines changes in the in-situ rock stress.

Figure 9:
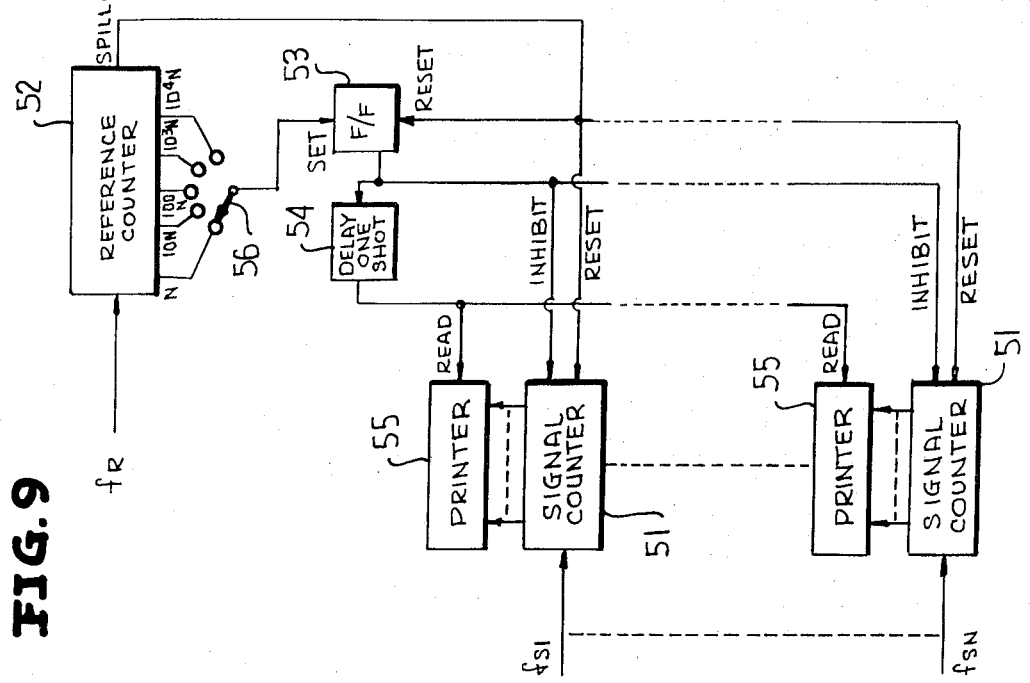
FIG. 9 is a schematic diagram of a processing arrangement for the signal provided by the acoustic gauge.

Referring to FIG. 9 of the accompanying drawings, there is illustrated a circuit for processing acoustic signals such as those generated by the apparatus of FIG. 4. Measurement signals, whose frequencies are representative of a measured parameter, are designated $f_{s1}......f_{sn}$. A temperature reference signal is designated $f_R$. Signals $f_{s1}$ through $f_{sn}$ are fed to respective binary counters 51 which may be fluidic or electronic. If the counters are fluidic the acoustic signals may be counted directly without the need for intermediate transducers; if electronic, pressure-to-voltage transducers must be employed. Similarly, other circuitry in FIG. 9 may be either fluidic or electronic.

Counters 51 count continuously in the absence of a received INHIBIT signal. The INHIBIT signal stops the counting procedure, causing the counter to hold its count. A RESET signal applied to counters 51 causes the count to return to zero.

Reference signal $f_R$ is fed to a reference binary counter 52 where its pulsations are counted. Counter 52 operates continuously, spilling over and resetting when the count reaches the capacity of the counter. Counter 52 includes logic circuitry associated with the various counter stages and provides binary one output pulse when the count reaches N, 10N, 100N, 1,000N and 10,000N. A switch 56 permits one of these output pulses to be detected and applied to the set input terminal of set-reset flip-flop 53. When the count in reference counter 52 reaches the selected value, flip-flop 53 is set. After a short delay, a delay one-shot multivibrator provides an output pulse. At spill-over, counter 52 provides a RESET signal which resets flip-flop 53 and all of counters 51.

The binary number stored in each ounter 51 is applied to a respective printer 55. Each printer is inhibited unless it receives a READ signal, at which time it converts the binary number received from counter 51 to a numerical readout. The INHIBIT signal for counters 51 is provided by the set output of the flip-flop 53; the READ signal for printers 55 is the output pulse from delay one shot 54.

In operation, assume all counters and flip-flops to be initially reset. As each pulse in signal $f_R$ is received, the count in counter 52 is incremented by one. Likewise, each pulse in signals $f_{S1}....f_{Sn}$ increments a respective counter 51. When reference counter 52 reaches a count of N (or whatever count value is selected by switch 56), flip-flop 53 is set and inhibits counters 51, causing these counters to store their existing counts. After a short interval corresponding to the inherent delay in delay one-shot 54, that element provides a READ pulse to printers 55 which respond by providing an indication of the counts stored in their respective counters 51.

Counter 52 continues to count and, upon reaching its capacity, provides a RESET signal which resets counters 51 and flip-flop 53. A new counting cycle is then repeated for each counter 51, 52.

To assure that counters 51 do not reach their count capacity before counter 52 reaches the selected count, counters 51 may be provided with larger capacities than counter 52 or, alternatively, the nominal frequency of $f_R$ can be chosen to be substantially equal to or higher than the frequencies of $f_{S1}...f_{Sn}$.

The advantages of the arrangement of FIG. 9 are best illustrated in the following analysis. Assume that signals $f_{S1}...f_{Sn}$ are borehole measurement signals derived from the apparatus of FIGS. 4, 5 and 6. Each measurement signal, $f_{S1}$ for example, may be represented by the following expressions:

$$f_{S1} = K_1 S_1 \sqrt{T}, \quad (1)$$

$$f_{Sn} = K_n S_n \sqrt{T}, \quad (2)$$

$$f_R = K_R S_R \sqrt{T}, \quad (3)$$

where $K_1, K_n, K_R$, are constants, $S_1, S_n$ are respective displacement relationships between frequency and the measured dimensions, which relationships are obtained from calibration curves such as curve A of FIG. 2, $S_R$ is a constant, and $T$ is temperature. During the period, $t$, in which reference counter 52 accumulates $N$ counts, $f_{S1}$ drives its counter 51 to $N_1$ counts. The counting period $t$ may be represented by equation (4):

$$t = N/f_R. \quad (4)$$

substituting from expression (3):

$$t = N/K_R S_R \sqrt{T}. \quad (5)$$

But $t$ may also be expressed in terms of $f_{S1}$ as follows:

$$t = N_1/f_{S1}. \quad (6)$$

Substituting for $f_{S1}$ from expression (1);

$$t = N_1/K_1 S_1 \sqrt{T}. \quad (7)$$

Setting the two expressions (5) and (7) equal to one another:

$$N_1/K_1 S_1 \sqrt{T} = N/K_R S_R \sqrt{T} \quad (8)$$

Solving for $N_1$:

$$N_1 = N K_1 S_1 / K_R S_R \quad (9)$$

Since $K_1, K_R$ and $S_R$ are constants, $N_1$ is seen to be only a function of its calibration curve as represented by $S_1$. Importantly, $N_1$ is not a function of $T$ (temperature), indicating that the measurment is completely compensated for temperature variations. In fact, any ambient conditions which affect both $f_R$ and $f_{S1}$ in the same manner is compensated for by the circuit of FIG. 9. The circuit, in effect, takes the ratio between signal and reference counts, and in so doing eliminates ambient factors affecting both signals.

The purpose of switch 56 is to permit a range of measurement capability which extends from a quick reasonably precise measurement to a somewhat slower but highly precise measurement. Specifically, the measurement precision increases as a function of the selected count base in the reference counter. This is somewhat analogous to the use of a ruler graduated to sixteenths of an inch versus use of a ruler graduated to quarters of an inch; the former is four times more precise than the latter. In this case, Switch 56 permits selection of precision over five orders of magnitude.

Figure 10:
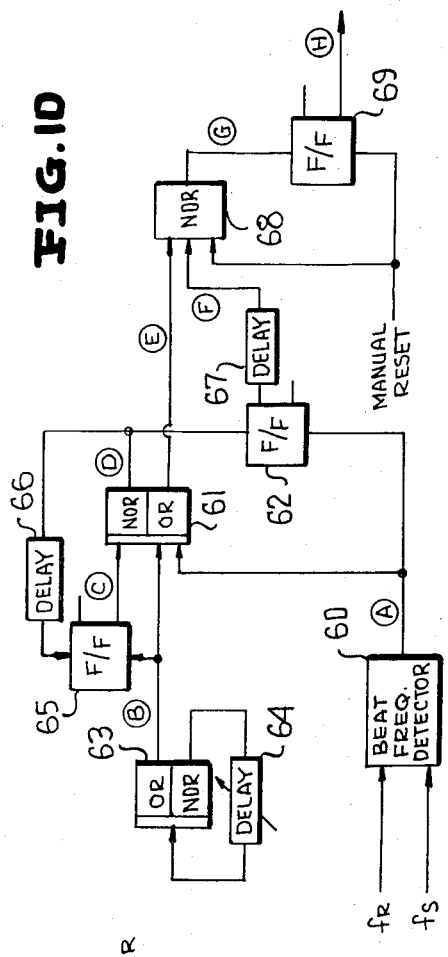
FIG. 10 is a schematic diagram of a fluidic circuit for providing a go-no go indication when the variable frequency acoustic gauge signal exceeds a predetermined frequency.

An alternative processing circuit for a variable frequency signal $f_S$ (such as is provided by the acoustic gauge of FIGS. 4, 5 and 6) is illustrated in FIG. 10 of the accompanying drawings. Signal $f_S$, having a frequency which is dependent upon a measured parameter as well as some ambient condition such as temperature, is applied to a fluidic beat frequency detector 60 along with signal $f_R$. The latter signal has a frequency which is varied with ambient parameters which affects signal $f_S$. Beat frequency detector may, for example, take the form described in U.S. Pat. No. 3,613,369 to Colston, and provides a fluid output signal at point A which has a frequency equal to the frequency difference between signals $f_S$ and $f_R$. This difference frequency signal is applied as one input signal to a three-input fluidic OR/NOR gate 61; it is also applied to the reset input port of a fluidic set-reset flip-flop 62.

An adjustable constant frequency pulse train B is provided by an oscillator comprising fluidic OR/NOR gate 63 and a fluid signal delay path 64. The delay path is connected between the NOR output port and an input port of the OR/NOR gate 63; the gate thus switches alternately between its OR and NOR states at a frequency determined by the delay introduced in path 64. Signal B is applied to the reset input port of fluidic set-reset flip-flop 65; it is also applied to OR/NOR gate 61. The set output terminal of flip-flop 65 provides signal C which is also connected to OR/NOR gate 61.

The NOR signal, D, from OR/NOR gate 61 is applied to the set input port of flip-flop 62; it is also applied via fluid signal delay path 66 to the set input port of flip-flop 65. Gate 61, delay means 66 and flip-flop 65 provide a gated pulse shaper which provides a pulse of fixed duration (determined by delay 66) from gate 61 whenever signals A and B are simultaneously binary zero.

The reset output signal from flip-flop 62 is applied via delay means 66 as signal F to fluidic NOR gate 68. Gate 68 also receives the OR output signal from gate 61 as signal E, and a manually generated reset signal. The output signal from NOR gate 68 is applied as signal G to the set input terminal of fluidic set-reset flip-flop 69, the latter also receiving the manually generated reset signal. The set output signal from flip-flop 69 is designated as signal H and provides the output signal for the circuit.

Figure 11:
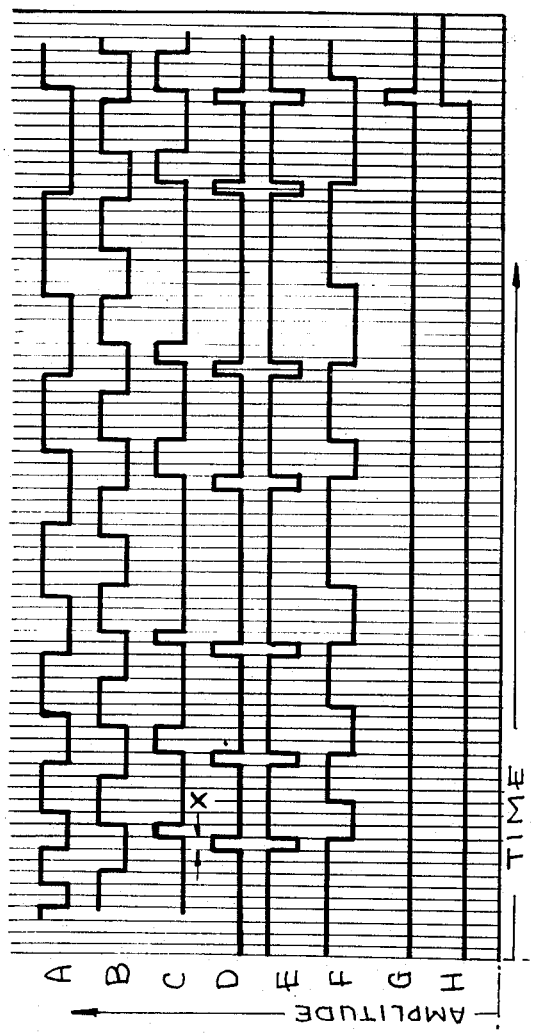
FIG. 11 A through H are timing diagrams depicting the waveforms of various signals in the circuit of FIG. 10.

Operation of the circuit of FIG. 10 is best understood with the aid of FIGS. 11A through 11H in which the various waveforms of signals A through H, respectively, are illustrated. The purpose of the circuit of FIG. 10 is to provide a binary one H signal whenever the frequency of signal A falls below a predetermined threshold frequency, indicating that the measured parameter has reached a predetermined threshold value. Since signal A represents the absolute value of $|f_S - f_R|$, decrease in frequency for signal A can represent either an increase or decrease in the frequency of signal $f_S$. Thus, if the frequency of signal $f_S$ is nominally greater than that of $f_{R1}$, a decrease in the frequency of $f_S$ produces a similar decrease in the frequency of signal A. On the other hand, if the frequency of $f_S$ is nominally lower than that of $f_R$, an increase in the frequency of $f_S$ results in a corresponding decrease in the frequency of signal A. In FIG. 11A, signal A is shown to gradually decrease in frequency, indicating that the measured parameter is approaching its threshold value. Signal B is at a constant frequency, the value of which will be shown to determine the value of the frequency of signal A at which signal H becomes binary one.

Since flip-flop 65 is assumed to be reset, rendering signal C binary zero, gate 61 is switched to its NOR mode (i,e., — signal D is binary one, signal E is binary zero) whenever signals A and B are simultaneously binary zero. In the example illustrated in FIGS. 11A and 11B, this first occurs during the last half of the first full period of signal B. At that time the binary one signal D is passed through delay 66 to set flip-flop 65. When flip-flop 64 is set, signal C becomes binary one and returns gate 61 to its OR state wherein signal D returns to binary zero. Thus signal D has been pulsed to binary one (and signal E to binary zero), the width of the pulse being determined by the time delay introduced by delay means 66. This time delay is designated by the letter $x$ in FIG. 11D.

The binary one pulse in signal D also sets flip-flop 62 which, after a delay occasioned by delay means 67, switches signal F to binary zero. The time delay occasioned by delay means 67 must be at least as great as that provided by element 66 ($x$) in order that signal F does not become binary zero before gate 61 is returned to its OR state by signal C.

With signal F at binary zero, NOR gate 68 is primed to await another binary zero pulse on signal E, it being assumed that the MANUAL RESET signal is binary zero. If another pulse on signal E were to occur before signal F is returned to binary one, signal G would become binary one to set flip-flop 69 and provide signal H at binary one. However, before another binary zero pulse can be provided on signal E, two events must occur: (1) flip-flop 65 must be reset by a binary one half cycle of signal B so that signal C returns to binary zero; and (2) signals B and A must thereafter become binary zero simultaneously. As illustrated in FIG. 11B, the start of the second full cycle of signal B resets flip-flop 65 to render signal C binary zero. However, before signal B returns to binary zero, signal A becomes binary one, thereby temporarily inhibiting the NOR state of gate 61 and resetting flip-flop 62. Signal F is thus returned to binary one (after the delay through element 67), thereby inhibiting NOR gate 68.

The above-described operation repeats each time signals A and B become binary zero simultaneously. Flip-flop 69 remains reset, due to the continued inhibition of NOR gate 68, until the frequency of signal A falls below its predetermined threshold. In FIG. 11A, this occurs during the seventh cycle of signal A. During this cycle, the falling edge of signal A occurs when signal B is binary zero. As described above, this results in: pulsing signals D and E, setting flip-flop 65 to render signal C binary one; and setting of flip-flop 62 to render signal F binary zero. Signal F thus primes NOR gate 68 which awaits another binary zero pulse on signal E. As illustrated in FIG. 11B while signal A remains binary zero, fixed frequency signal B returns to binary one and resets flip-flop 61, thereby rendering signal C binary zero. Gate 61 is thus primed to await the next simultaneous occurrence of binary zeros in signals A and B. As illustrated, signal B does in fact return to binary zero while signal A remains in that state, thereby switching gate 61 to its NOR state and pulsing signal E to binary zero. That pulse actuates NOR gate 68 which in turn sets flip-flop 69 to provide signal H at binary one.

Signal H remains at binary one, indicating that the measured parameter (e.g., — borehole diameter) has reached some pre-established threshold, until flip-flop 69 is manually reset. This reset may, of course, be automatic, depending upon the use of the circuit. If the circuit of FIG. 10 is part of a process control arrangement, signal H may be used to actuate a control member which operates to restore the measured parameter to within its prescribed limits. When this occurs, the reset signal for flip-flop 69 may be generated automatically. For example, if it is desired to use the circuit of FIG. 10 to control a turbine, $f_S$ may represent the turbine speed and $f_R$ a reference frequency, in the manner described in the afore-mentioned Colston patent. Signal A could then be monitored as in FIG. 10, with signal H being employed to initiate a cut-off of fuel flow to the turbine when $f_S$ exceeds a maximum desired frequency.

The threshold frequency is adjustable by adjustment of delay means 64 in the constant frequency oscillator. Specifically, the condition for actuating NOR gate 68 can be represented as follows:

$$1/f_A > (1/f_B + x)$$

where $f_A$ is the frequency of signal A, $f_B$ is the frequency of signal B, and $x$ is the delay introduced by delay member 66. In other words, signal H becomes binary one when the period of signal A is greater than the period of signal B plus the delay period introduced by element 66. The period of signal B is adjustable by adjustment of delay member 64 so that the circuit is readily adaptable to operate over a wide range of thresholds.

While we have described and illustrated specific embodiments of our invention, it will be clear that variations of the details of construction which are specifically illustrated and described may be resorted to without departing from the true spirit and scope of the invention as defined in the appeded claims.

We claim:
1. A fluidic element comprising:
    a tube having open first and second ends;
    a nozzle for issuing a jet of air past said first end such that a standing wave pattern of vibrating air is established in said tube, said vibrating air operating to cyclically deflect said jet of air at the frequency of said vibrating air;
    means for positioning said second end of said tube sufficiently close to a surface such that over a continuous range of increasing displacement between said second end and said surface, the frequency of said vibrating air exhibits a continuously increasing frequency; and
    means for monitoring the frequency of deflection of said jet of air.
2. Apparatus for gauging the position of an object having a generally flat surface, said apparatus comprising:
    a tube having an open mouth, an open sensor end, a longitudinal axis, a specified length, and a specified inside diameter;
    means for mounting said tube to permit relative displacement between said sensor end and said surface, said longitudinal axis at said sensor end being generally perpendicular to said surface;
    excitation means disposed at said mouth of said tube for establishing a continuously vibrating column of air in said tube, thereby creating a pattern of standing pressure waves having a characteristic nominal frequency dependent upon the length of said tube and the velocity of sound in said tube; and
    means for monitoring the frequency of said standing wave pattern as a predetermined continuous function of the displacement between said sensor end and said surface over a continuous range of dsplacements in which the maximum displacement is small relative to the inside diameter of said tube, said predetermined function exhibiting an increasing frequency in response to increasing displacement between said sensor end and said surface.
3. The apparatus according to claim 2 wherein said excitation means includes means for issuing a jet of air across said mouth of said tube.
4. The apparatus according to claim 2 wherein said tube is of hollow cylindrical configuration.
5. The apparatus according to claim 2 wherein said means for mounting includes:
    a support member to which said tube is secured;
    a retainer for supporting said object for movement along said longitudinal axis; and
    bias means secured to said support member and said object for continuously urging increased displacement therebetween.
6. The apparatus according to claim 5 wherein said bias means comprises a spring bellows extending between said support member and said object and surrounding the region between said sensor end of said tube and said surface.
7. The apparatus according to claim 2 employed in an environment wherein variation in an ambient condition produces predetermined variations in the characteristic frequency of said standing wave pattern, said apparatus further comprising:
    means for generating a reference signal having a reference frequency which exhibits said predetermined variations from a nominal frequency in response to variations in said ambient condition; and
    signal processing means for computing the ratio between the frequency of said standing wave pattern and said reference frequency to provide an indication of the displacement between said sensor end and said surface, which indication is fully compensated for variations in said ambient condition.
8. The apparatus according to claim 7 wherein said ambient condition is temperature, and wherein said signal processing means comprises:
    a reference counter for continuously counting cycles of said reference frequency;
    means for generating an inhibit signal when the count in said reference counter reaches a predetermined number $N_R$;
    a signal counter for counting cycles of said standing wave pattern;
    means for simultaneously resetting said reference and signal counters to zero;
    means responsive to said inhibit signal for terminating counting and storing the existing count $N_S$ at said signal counter; and
    means for providing an indication of the value $N_S/N_R$.

9. The apparatus according to claim 8 wherein said reference and signal counters are binary counters comprised of fluidic components.
10. The apparatus according to claim 2 further comprising:
    means for generating a fluid signal having a reference frequency alternating between binary one and binary zero conditions;
    detector means for providing a detected fluid signal which alternates between binary zero and binary one states and having a frequency equal to the difference between said reference frequency and the frequency of said standing wave pattern;
    a fluidic oscillator for providing a fixed frequency fluid signal; and
    fluidic logic means for providing a specified signal when the period of said detected fluid signal exceeds the period of said fixed frequency fluid signal by a specified amount.
11. The apparatus according to claim 10 wherein said fluidic logic means comprises:
    first and second fluidic set-reset flip-flops having set and reset output passages;
    a three-input fluidic OR/NOR gate;
    means for resetting said first flip-flop each time said fixed frequency signal becomes binary one;
    means for connecting the set output passage and said detected and fixed frequency signals to said OR/NOR gate as said three-inputs;
    means responsive to said OR/NOR gate in its NOR state for setting said second flip-flop and, after a predetermined delay, setting said first flip-flop;
    means for resetting said second flip-flop whenever said detected signal is in its binary one state; and means for providing said specified signal in response to the switching of said OR/NOR gate to its NOR state while said second flip-flop is reset.

12. The apparatus according to claim 11 further comprising means for selectively adjusting the fixed frequency of said oscillator signal.

13. The apparatus according to claim 2 further comprising means for monitoring relatively large displacements between said sensor end and said object by detecting harmonically related frequency changes in said standing wave pattern.

14. The method of gauging distance to a surface comprising the steps of:
establishing a standing wave pattern of vibrating air in a tube having first and second open ends and a specified inside diameter;
positioning said second end of said tube proximate said surface;
monitoring increasing frequency of said standing wave pattern as a function of increasing displacement between said second end of said tube and said surface.

15. The method according to claim 14 wherein said step of monitoring is performed over a range of displacements which are small relative to said inside diameter of said tube, said frequency in said range increasing with displacement according to a predetermined function.

16. The method according to claim 15 further comprising the step of compensating for temperature variations affecting the frequency of said standing wave pattern, said step of compensating including the steps of:

generating a reference signal having a frequency which is affected by temperature variations in the same manner that the frequency of said standing wave pattern is affected; and
computing with fluidic circuitry the ratio of the reference signal frequency to the frequency of said standing wave pattern.

17. The method according to claim 15 further comprising the step of monitoring relatively large displacements between said second end of said tube and said surface by detecting jumps between harmonically related frequencies in the standing wave pattern.

18. The method according to claim 15 further comprising the step of providing an indication when the displacement between said second end of said tube and said surface passes a predetermined threshold displacement, said last-mentioned step including the steps of:
generating a first reference signal having a reference frequency;
generating a difference signal having a frequency equal to the difference between said reference frequency and the frequency of said standing wave pattern;
generating a second reference signal having an adjustable constant frequency;
providing said indication upon detecting that the period of said difference signal exceeds the period of said second reference signal by a predetermined amount.

\* \* \* \* \*